(12) United States Patent
Harada

(10) Patent No.: US 7,679,766 B2
(45) Date of Patent: Mar. 16, 2010

(54) INFORMATION PROCESSING APPARATUS, INFORMATION PROCESSING METHOD, AND SYSTEM FOR DETERMINING A DESTINATION FOR PRINT DATA

(75) Inventor: Takuto Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1102 days.

(21) Appl. No.: 11/212,704

(22) Filed: Aug. 29, 2005

(65) Prior Publication Data

US 2006/0044608 A1 Mar. 2, 2006

(30) Foreign Application Priority Data

Aug. 30, 2004 (JP) ............................... 2004-250928

(51) Int. Cl.
*G06F 3/12* (2006.01)
(52) U.S. Cl. .................... 358/1.15; 358/1.14; 358/1.16
(58) Field of Classification Search ................ 358/1.15, 358/1.14, 1.16
See application file for complete search history.

(56) References Cited

U.S. PATENT DOCUMENTS

| | | | | | |
|---|---|---|---|---|---|
| 5,754,308 | A | * | 5/1998 | Lopresti et al. | 358/403 |
| 5,995,722 | A | * | 11/1999 | Kishida | 358/1.15 |
| 6,031,634 | A | | 2/2000 | Shimada et al. | 358/426 |
| 2001/0029513 | A1 | | 10/2001 | Kuwano et al. | 707/522 |
| 2003/0197887 | A1 | * | 10/2003 | Shenoy et al. | 358/1.15 |
| 2004/0032614 | A1 | * | 2/2004 | Tanaka et al. | 358/1.15 |
| 2005/0063001 | A1 | * | 3/2005 | Tanimoto | 358/1.15 |
| 2006/0050308 | A1 | * | 3/2006 | Wakana | 358/1.15 |

FOREIGN PATENT DOCUMENTS

JP 10-308868 11/1998

* cited by examiner

*Primary Examiner*—Twyler L Haskins
*Assistant Examiner*—Jacky X Zheng
(74) *Attorney, Agent, or Firm*—Fitzpatrick, Cella, Harper & Scinto

(57) ABSTRACT

When a printing apparatus serving as a print data destination does not have the iPrint function (S302), print data is transmitted to a printing apparatus having the iPrint function (S311).

10 Claims, 9 Drawing Sheets

INFORMATION PROCESSING APPARATUS, INFORMATION PROCESSING METHOD, AND SYSTEM FOR DETERMINING A DESTINATION FOR PRINT DATA

FIELD OF THE INVENTION

The present invention relates to a technique of transmitting print data to a printing apparatus on a network.

BACKGROUND OF THE INVENTION

There has conventionally been proposed a technique of assigning a document ID to a document read by a digital copying machine, printing the document with the document ID, and registering the data in an HDD (Japanese Patent Laid-Open No. 10-308868). According to this technique, document data which is registered in the HDD by reading again the document printed with the document ID, and the document is printed again.

This technique is targeted at a document read by a copying machine, but can also be applied to a case wherein print data from a host computer is printed by a printer. In this case, print data is held in the memory of the printer, a document ID is assigned to the print data, and then the print data is printed. The printed product is read by another copying machine, read out from its memory, and reused.

However, the latter system cannot attain the effects of the technique if a printer which is intended by the user to print target data does not have the above-mentioned functions of holding print data and assigning a document ID.

SUMMARY OF THE INVENTION

The present invention has been made to overcome the conventional drawbacks, and has as its object to provide a technique of achieving the above effects even if a printing apparatus as a print data destination does not have the above-mentioned functions.

In order to achieve an object of the present invention, for example, an information processing apparatus of the present invention comprises the following arrangement.

That is, an information processing apparatus which transmits print data to one printing apparatus among a plurality of printing apparatuses connected to a network, comprising:

a determination unit, adapted to determine whether the printing apparatus serving as a destination of the print data has a function of holding, in a predetermined memory, intermediate data generated when printing is done on the basis of the received print data, and adding a code representing a save destination of the intermediate data to the print data;

a first transmission unit, adapted to transmit the print data to the printing apparatus when the printing apparatus serving as the destination has the function;

a search unit, adapted to search for an apparatus having at least a function of holding in the predetermined memory out of the function when the printing apparatus serving as the destination does not have the function;

a second transmission unit, adapted to transmit the print data to one apparatus among at least one apparatus searched by the search unit so as to hold the print data in the predetermined memory; and a third transmission unit, adapted to add, to the print data, a code representing a save destination of the print data transmitted from the second transmission unit, and transmit the print data to the printing apparatus serving as the destination.

In order to achieve an object of the present invention, for example, an information processing apparatus of the present invention comprises the following arrangement.

That is, an information processing apparatus which transmits print data to one printing apparatus among a plurality of printing apparatuses connected to a network, comprising:

a determination unit, adapted to determine whether the printing apparatus serving as a destination of the print data has a function of holding, in a predetermined memory, intermediate data generated when printing is done on the basis of the received print data, and adding a code representing a save destination of the intermediate data to the print data;

a first transmission unit, adapted to transmit the print data to the printing apparatus when the printing apparatus serving as the destination has the function;

a search unit, adapted to search for an apparatus having the function when the printing apparatus serving as the destination does not have the function; and a second transmission unit, adapted to transmit the print data and information for specifying the printing apparatus serving as the destination to at least one apparatus searched by the search unit so as to hold the print data in the predetermined memory, add a code representing a save destination of the print data, and transfer, to the printing apparatus serving as the destination, print data to which the code representing the save destination is added.

In order to achieve an object of the present invention, for example, an information processing apparatus of the present invention comprises the following arrangement.

That is, an information processing apparatus comprising:

a reception unit, adapted to receive print data;

a save unit, adapted to save print data received by the reception unit in a predetermined memory;

an addition unit, adapted to add a code representing a save destination of the print data saved by the save unit to the print data received by the reception unit;

an identification unit, adapted to identify a destination of the print data received by the reception unit; and a transfer unit, adapted to transfer, to the destination identified by the identification unit, the print data to which the code representing the save destination is added by the addition unit.

In order to achieve an object of the present invention, for example, a system of the present invention comprises the following arrangement.

That is, a system comprising a plurality of printing apparatuses connected to a network, and an information processing apparatus that transmits print data to one printing apparatus among the plurality of printing apparatuses, the information processing apparatus comprising a determination unit, adapted to determine whether a first printing apparatus serving as a destination of the print data has a function of holding, in a predetermined memory, intermediate data generated when printing is done on the basis of the received print data, and adding a code representing a save destination of the intermediate data to the print data, a first transmission unit, adapted to transmit the print data to the first printing apparatus when the first printing apparatus has the function, a search unit, adapted to search the plurality of printing apparatuses for a printing apparatus having at least a function of holding in the predetermined memory out of the function when the first printing apparatus does not have the function, and a second transmission unit, adapted to transmit the print data and information for specifying the first printing apparatus to a second printing apparatus searched by the search unit, and the second printing apparatus comprising a registration unit, adapted to register, in the predetermined memory, an image based on the print data transmitted from the second transmission unit, an addition unit, adapted to add a code representing a registration destination of the print data by the registration unit, and a transfer unit, adapted to transfer, to the first printing apparatus, the print data transmitted from the second transmission unit and the code which is added by the addition unit and represents the registration destination.

In order to achieve an object of the present invention, for example, an information processing method of the present invention comprises the following arrangement.

That is, an information processing method of transmitting print data to one printing apparatus among a plurality of printing apparatuses connected to a network, comprising:

a determination step of determining whether the printing apparatus serving as a destination of the print data has a function of holding, in a predetermined memory, intermediate data generated when printing is done on the basis of the received print data, and adding a code representing a save destination of the intermediate data to the print data;

a first transmission step of transmitting the print data to the printing apparatus when the printing apparatus serving as the destination has the function;

a search step of searching for an apparatus having at least a function of holding in the predetermined memory out of the function when the printing apparatus serving as the destination does not have the function;

a second transmission step of transmitting the print data to one apparatus among at least one apparatus searched in the search step so as to hold the print data in the predetermined memory; and a third transmission step of adding, to the print data, a code representing a save destination of the print data transmitted in the second transmission step, and transmitting the print data to the printing apparatus serving as the destination.

In order to achieve an object of the present invention, for example, an information processing method of the present invention comprises the following arrangement.

That is, an information processing method of transmitting print data to one printing apparatus among a plurality of printing apparatuses connected to a network, comprising:

a determination step of determining whether the printing apparatus serving as a destination of the print data has a function of holding, in a predetermined memory, intermediate data generated when printing is done on the basis of the received print data, and adding a code representing a save destination of the intermediate data to the print data;

a first transmission step of transmitting the print data to the printing apparatus when the printing apparatus serving as the destination has the function;

a search step of searching for an apparatus having the function when the printing apparatus serving as the destination does not have the function; and a second transmission step of transmitting the print data and information for specifying the printing apparatus serving as the destination to at least one apparatus searched in the search step so as to hold the print data in the predetermined memory, add a code representing a save destination of the print data, and transfer, to the printing apparatus serving as the destination, print data to which the code representing the save destination is added.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
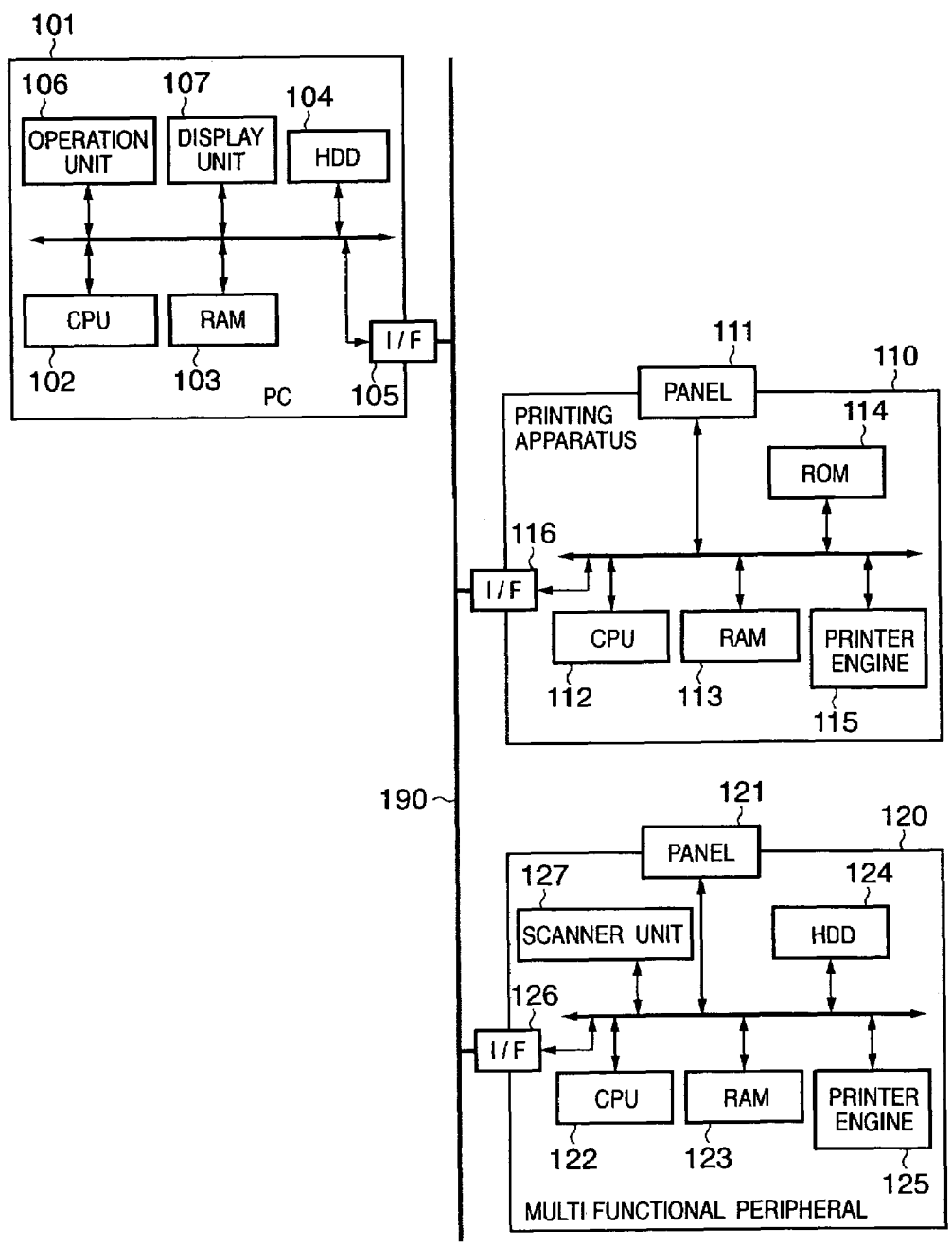
FIG. 1 is a block diagram showing the basic configuration of a printing system according to the first embodiment of the present invention.

FIG. 1 is a block diagram showing the basic configuration of a printing system according to the first embodiment. As shown in FIG. 1, the system in FIG. 1 comprises a PC (Personal Computer) 101, printing apparatus 110, and multi-functional peripheral 120.

The PC 101 will be described first.

The PC 101 is comprised of a CPU 102, RAM 103, HDD (Hard Disk Drive) 104, I/F 105, operation unit 106, and display unit 107.

The CPU 102 controls the overall PC 101 by using programs and data loaded to the RAM 103, and executes processes (to be described later) to be performed by the PC 101.

The RAM 103 has an area for temporarily storing programs and data loaded from the HDD 104, and a work area used to perform various processes by the CPU 102. The RAM 103 also has an area for temporarily storing received data and data to be transmitted via the I/F 105.

The HDD 104 saves programs and data for causing an OS (Operating System) or the CPU 102 to execute processes (to be described later) to be performed by the PC 101, driver software of the printing apparatus 110, and driver software of the multi-functional peripheral 120. If necessary, some or all of these programs and data are read out to the RAM 103 under the control of the CPU 102, and processed by the CPU 102.

The I/F 105 functions as an interface for connecting the PC 101 to a network 190, and the PC 101 performs data communication via the I/F 105 with a device connected to the network 190. The network 190 is not limited to a wireless or wired network, and the I/F 105 and I/Fs 116 and 126 of other devices comply with the form of the network 190.

The operation unit 106 is made up of operation devices such as a keyboard and mouse, and the operator of the PC 101 can operate the operation unit 106 to input various instructions and data.

The display unit 107 is formed from a CRT, liquid crystal panel, or the like, and displays a process result by the CPU 102 with images and texts.

Note that the configuration of the PC 101 is not limited to this.

Next, the printing apparatus 110 will be explained.

The printing apparatus 110 is comprised of a. panel 111, a CPU 112, a RAM 113, a ROM 114, a printer engine 115, and the interface 116.

The panel 111 has buttons for inputting various settings and instructions, and a display panel for displaying various types of information. When the display panel is a touch panel, some or all of the buttons may be button images displayed on the display panel.

The CPU 112 controls the overall printing apparatus 110 by using programs and data which are stored in the RAM 113 and ROM 114, and executes processes (to be described later) to be performed by the printing apparatus 110.

The RAM 113 has an area for temporarily storing data transmitted from the PC 101, and a work area necessary to execute various processes by the CPU 112.

The ROM 114 stores data associated with the printing apparatus 110 (e.g., a startup program and set data of the printing apparatus 110).

The printer engine 115 has a mechanism of printing on a printing medium (e.g., paper or OHP) in accordance with print data transmitted from the PC 101.

The I/F 116 functions as an interface for connecting the printing apparatus 110 to the network 190, and the printing apparatus 110 performs data communication via the I/F 116 with a device connected to the network 190.

Note that the configuration of the printing apparatus 110 is not limited to this.

Further, the multi-functional peripheral 120 will be explained.

The multi-functional peripheral 120 is comprised of a panel 121, a CPU 122, a RAM 123, an HDD 124, a printer engine 125, the I/F 126, and a scanner unit 127.

The panel 121 has buttons for inputting various settings and instructions, and a display panel for displaying various types of information. When the display panel is a touch panel, some or all of the buttons may be button images displayed on the display panel.

The CPU 122 controls the overall multi-functional peripheral 120 by using programs and data which are stored in the RAM 123, and executes processes (to be described later) to be performed by the multi-functional peripheral 120.

The RAM 123 has an area for temporarily storing data transmitted from the PC 101, and a work area necessary to execute various processes by the CPU 122. The RAM 123 also has an area for temporarily storing image data read by the scanner unit 127.

The HDD 124 saves programs and data for causing the CPU 122 to control the whole multi-functional peripheral 120, programs and data for causing the CPU 122 to execute processes (to be described later) to be performed by the multi-functional peripheral 120, and data associated with the multi-functional peripheral 120. Some or all of these programs and data are read out to the RAM 123 under the control of the CPU 122, and processed by the CPU 122.

The printer engine 125 has a mechanism of printing on a printing medium (e.g., paper or OHP) in accordance with print data transmitted from the PC 101 or image data read by the scanner unit 127.

The I/F 126 functions as an interface for connecting the multi-functional peripheral 120 to the network 190, and the multi-functional peripheral 120 performs data communication via the I/F 126 with a device connected to the network 190.

The scanner unit 127 reads an image or character printed on a printing medium, and outputs the read result as image data to the RAM 123.

Note that the configuration of the multi-functional peripheral 120 is not limited to this.

The functional configurations of the PC 101, printing apparatus 110, and multi-functional peripheral 120 will be explained.

Figure 2:
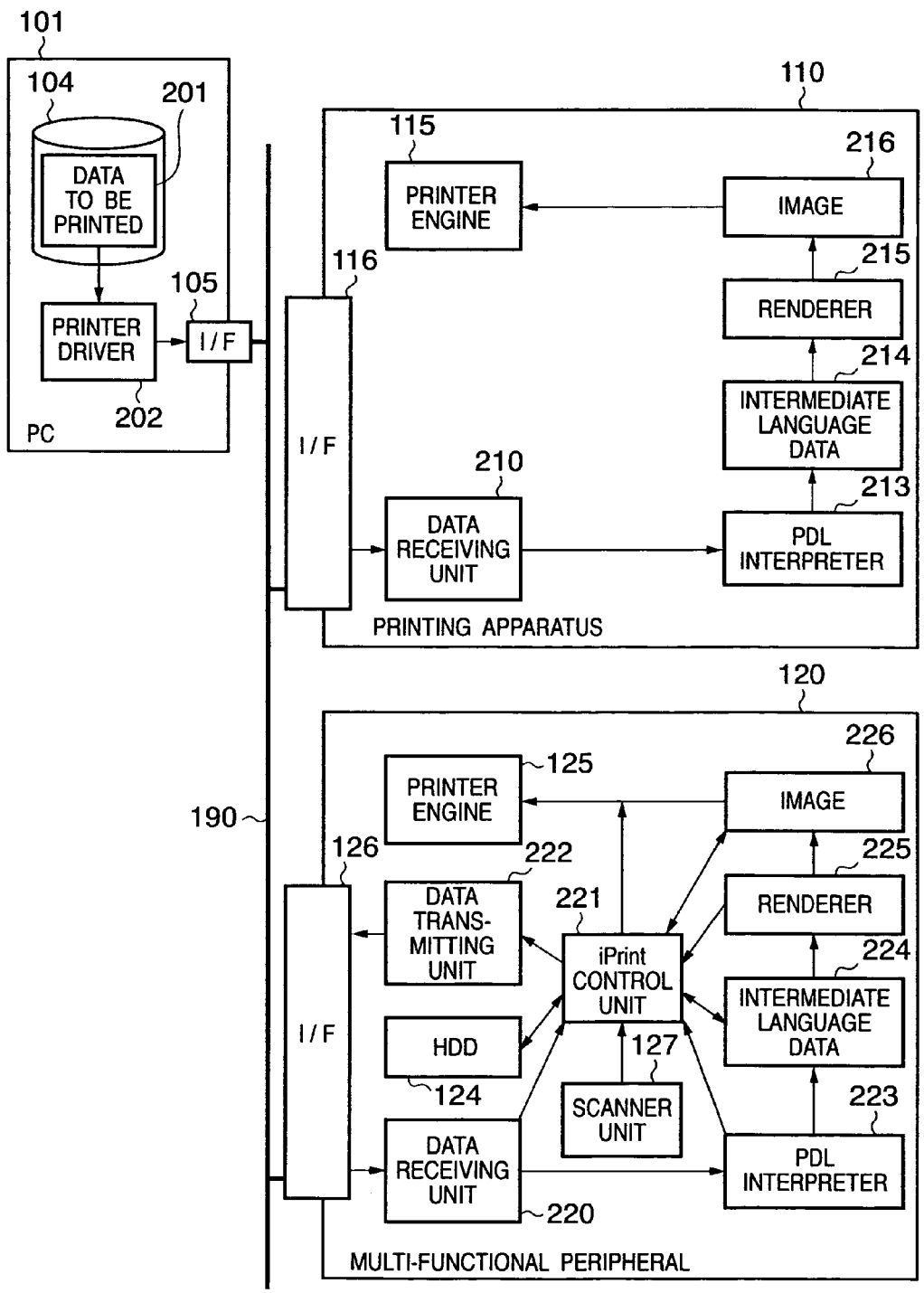
FIG. 2 is a block diagram showing the functional configurations of a PC 101, printing apparatus 110, and multi-functional peripheral 120.

FIG. 2 is a block diagram showing the functional configurations of the PC 101, printing apparatus 110, and multi-functional peripheral 120. In FIG. 2, the same reference numerals as in FIG. 1 denote the same parts.

The functional configuration of the PC 101 will be described.

Reference numeral 201 denotes data to be printed which is document data or image data created by an application or the like in the PC 101. The created data 201 is saved in the HDD 104.

Reference numeral 202 denotes a printer driver which converts the data 201 to be printed into print data such as PDL data. The first embodiment prepares two printer drivers 202 for the printing apparatus 110 and multi-functional peripheral 120, respectively.

Print data generated by the printer driver 202 is transmitted to a designated destination via the I/F 105.

The functional configuration of the printing apparatus 110 will be described.

Print data transmitted from the PC 101 via the I/F 105 and network 190 is received by a data receiving unit 210 via the I/F 116.

Reference numeral 213 denotes a PDL interpreter which accepts and interprets print data received by the data receiving unit 210. The PDL interpreter 213 includes PostScript and LIPS.

Reference numeral 214 denotes intermediate language data which is generated as data interpretable by the printing apparatus 110 as a result of interpretation by the PDL interpreter 213. The intermediate language data is a display list which is obtained by a PDL data rasterization process, and represents elements to be drawn and their order. The display list does not depend on the PDL type, and can be printed by various printers of different PDL types.

Reference numeral 215 denotes a renderer which renders an image 216 on the basis of the intermediate language data 214. The image 216 is sent to the printer engine 115, and printed on a printing medium.

The contents of a series of processes of printing by the printing apparatus 110 on the basis of print data, and a functional configuration for these processes are well known, and a further description thereof will be omitted.

The functional configuration of the multi-functional peripheral 120 will be described.

Print data transmitted from the PC 101 via the I/F 105 and network 190 is received by a data receiving unit 220 via the I/F 126. The data receiving unit 220 analyzes the print data, and sends it to either PDL interpreter 223 or an iPrint control unit 221 as the transfer destination of the print data in accordance with the analysis result.

The iprint control unit 221 controls a series of processes as follows. More specifically, the iPrint control unit 221 holds intermediate data 224 generated by the PDL interpreter 223 (to be described later) as a file in the memory of the multi-functional peripheral 120 (i.e., the internal memory of the iPrint control unit 221 or the HDD 124). When the intermediate data 224 cannot be held in the memory, the intermediate data 224 is transferred to another printing apparatus (including a copying machine) or another storage device, and held at the transfer destination. At the same time, a code representing the save destination of intermediate data (e.g., a one- or two-dimensional barcode which is information representing the save destination of intermediate data) is added to a printed product obtained by the printer engine 125, and printed. The save destination contain information for specifying an apparatus which holds an intermediate data file, and information for specifying the intermediate data file. A function of performing the series of processes will be called an "iPrint function". The first embodiment assumes that the printing apparatus 110 does not have any iprint function, whereas the multi-functional peripheral 120 has the iprint function.

Reference numeral 222 denotes a data transmitting unit. Upon reception of a request for print data via the network 190, the iPrint control unit 221 reads out the requested print data among print data saved in the HDD 124, and transmits the readout print data from the data transmitting unit 222 to the requesting side.

The PDL interpreter 223 accepts and interprets print data received by the data receiving unit 220.

The intermediate language data 224 is generated as data interpretable by the multi-functional peripheral 120 as a result of interpretation by the PDL interpreter 223.

Reference numeral 225 denotes a renderer which renders an image 226 on the basis of the intermediate language data 224. The image 226 is sent to the printer engine 125, and printed on a printing medium.

The scanner 127 reads information printed on a printing medium, and sends the information to the iPrint control unit 221. The iprint control unit 221 saves the information in the HDD 124.

Figure 3:
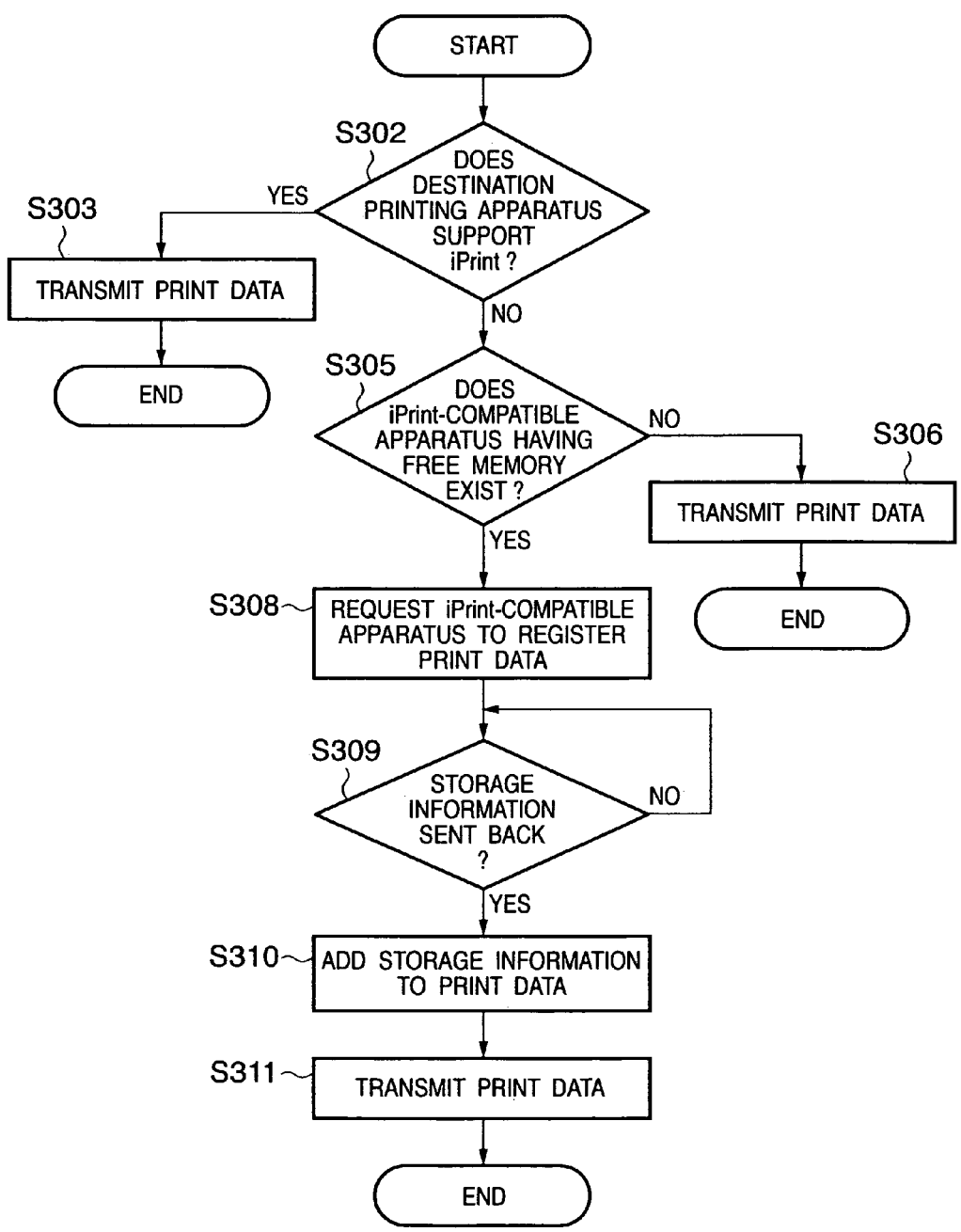
FIG. 3 is a flowchart showing a process executed when the PC 101 transmits print data to either the printing apparatus 110 or multi-functional peripheral 120.

FIG. 3 is a flowchart showing a process executed when the PC 101 transmits print data to either the printing apparatus 110 or multi-functional peripheral 120. A program and data for causing the CPU 102 to execute the process complying with the flowchart of FIG. 3 are loaded from the HDD 104 to the RAM 103. The program and data are executed by the CPU 102, and the PC 101 performs processes to be described below.

Figure 8:
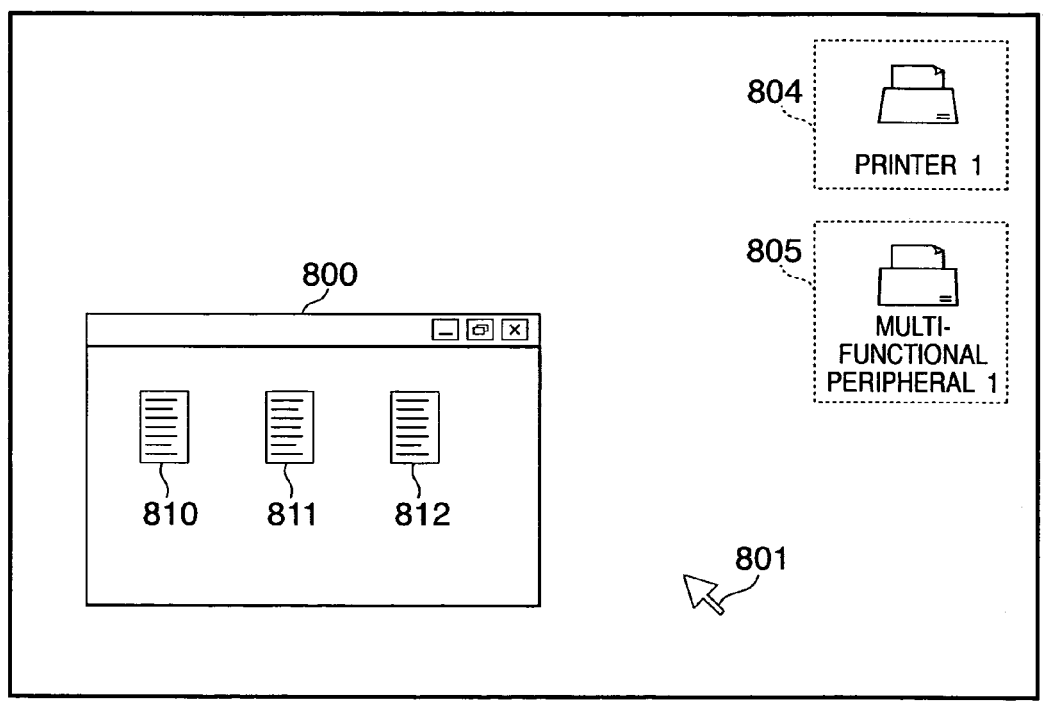
FIG. 8 is a view showing a display example of a window for designating printing of target data.

The operator of the PC 101 uses the operation unit 106 to input an instruction to print target data. FIG. 8 is a view showing a display example of a window for designating printing of target data. The window in FIG. 8 is displayed on the display screen of the display unit 107.

In FIG. 8, reference numeral 800 denotes a GUI of a folder which holds three files 810, 811, and 812. Reference numerals 810, 811, and 812 denote icons representing files. These files are saved in the HDD 104 as the data 201 to be printed.

Reference numeral 801 denotes a mouse cursor which can move its position by using the operation unit 106.

Reference numeral 804 denotes an icon representing that driver software of the printing apparatus 110 is installed in the HDD 104 and the printing apparatus 110 can be used as a print data output destination. The icon 804 also presents the name of the printing apparatus 110, but another information may also be displayed.

Reference numeral 805 denotes an icon representing that driver software of the multi-functional peripheral 120 is installed in the HDD 104 and the multi-functional peripheral 120 can be used as a print data output destination. The icon 805 also presents the name of the multi-functional peripheral 120, but another information may also be displayed.

The operator can print an arbitrary one of the files 810, 811, and 812 by either the printing apparatus 110 or multi-functional peripheral 120.

Figure 9:
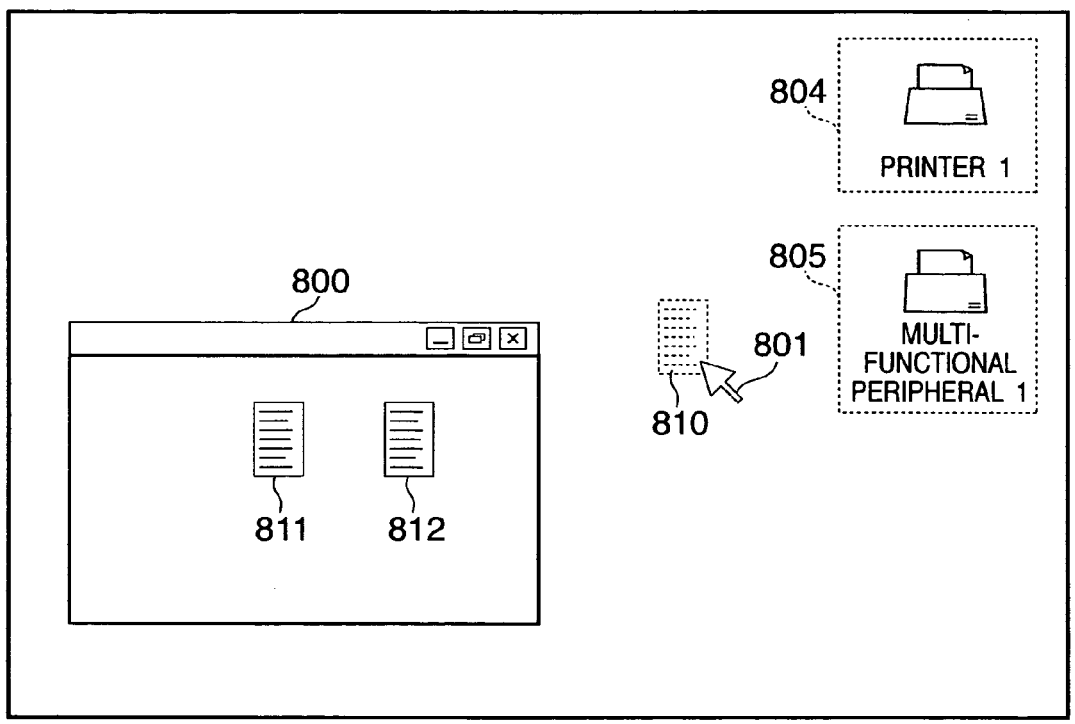
FIG. 9 is a view showing a display example of a window when a file 810 is printed.

FIG. 9 is a view showing a display example of a window when the file 810 is printed. The window in FIG. 9 is displayed on the display screen of the display unit 107.

For example, the mouse included in the operation unit 106 is operated to move the display position of the mouse cursor 801 to the display position of the file 810 in the folder 800. At this position, the mouse button is clicked to display the icon of the file 810 in gray. While the mouse button is kept clicked, the mouse cursor 801 is moved. Then, the display position of the grayed icon of the file 810 changes following the movement.

The icon of the file 810 is moved close to the display position of the icon 804 of the printing apparatus 110, and clicking of the mouse button is canceled at this position. In response to this, an instruction to print the file 810 by the printing apparatus 110 can be input to the CPU 102. Also, the icon of the file 810 is moved close to the display position of the icon 805 of the multi-functional peripheral 120, and clicking of the mouse button is canceled at this position. In response to this, an instruction to print the file 810 by the multi-functional peripheral 120 can be input to the CPU 102. The method of deciding a file to be printed, and the method of designating printing of a file are not limited to the above methods.

In any case, the operator of the PC 101 uses the operation unit 106 to designate a file (data) to be printed and input an instruction to print the data. The process according to the flowchart shown in FIG. 3 starts when these instructions are input and detected by the CPU 102.

The CPU 102 loads, from the HDD 104 to the RAM 103, the printer driver 202 of an apparatus (printing apparatus 110 or multi-functional peripheral 120) which is to print. The CPU 102 executes the printer driver 202 to inquire whether the apparatus has the iPrint function (step S302).

The printing apparatus 110 and multi-functional peripheral 120 respectively store data representing whether they have the iprint function. Upon reception of the inquiry from the PC 101, the printing apparatus 110 and multi-functional peripheral 120 refer to the data, and send back to the PC 101 data representing whether they have the iprint function. From these data, the PC 101 can determine whether the apparatus which is to print has the iprint function.

The process and configuration for making this determination are not limited to the above ones, and the following method is also conceivable. Data (iprint function presence/absence data) representing whether the printing apparatus 110 has the iprint function is attached in advance to the printer driver of the printing apparatus 110. Data representing whether the multi-functional peripheral 120 has the iprint function is attached in advance to the printer driver of the multi-functional peripheral 120. The printer driver of an apparatus (printing apparatus 110 or multi-functional peripheral 120) which is to print is loaded from the HDD 104 to the RAM 103. The iprint function presence/absence data attached to the printer driver is referred to, and it is determined whether the apparatus has the iPrint function.

In any case, if the apparatus which is to print has the iPrint function, the process advances to step S303. The data 201 to be printed is converted into print data in the above-described manner by the printer driver 202 of the apparatus, and the print data is transmitted to the apparatus (step S303).

If the apparatus which is to print does not have any iPrint function, the process advances to step S305. An inquiry is sent to the printing apparatus 110 and multi-functional peripheral 120 present on the network by using the broadcast function of TCP/IP, thereby searching for an apparatus which has the iprint function and has a free memory enough to store print data to be transmitted by its data size (step S305).

More specifically, the CPU 102 inquires, of the printing apparatus 110 by using the printer driver of the printing apparatus 110 or another application software, whether the printing apparatus 110 has the iPrint function and has a free memory enough to store print data to be transmitted. The CPU 102 receives a response representing the result of the inquiry from the printing apparatus 110. Also, the CPU 102 inquires, of the multi-functional peripheral 120 by using the printer driver of the multi-functional peripheral 120, whether the multi-functional peripheral 120 has the iPrint function and has a free memory enough to store print data to be transmitted. The CPU 102 receives a response representing the result of the inquiry from the multi-functional peripheral 120.

If an apparatus which has the iprint function and has a free memory enough to store print data to be transmitted by its data size is not found as a result of the search process, the process advances to step S306 to transmit print data to an apparatus designated as a print data destination (step S306).

If apparatuses each of which has the iPrint function and has a free memory enough to store print data to be transmitted by its data size are found as a result of the search process, one of the apparatuses is selected. This selection is preferably automatically done under a predetermined condition. Alternatively, when a plurality of apparatuses are found, pieces of information (e.g., apparatus names) on the found apparatuses may be listed and displayed on the display unit 107 to prompt the operator to select one of the apparatuses with the operation unit 106.

After one print data destination is determined, print data is transmitted to the apparatus in order to only register intermediate data (not to cause the apparatus to print). Upon reception of the request, the receiving apparatus saves the print data as intermediate data in the memory of the apparatus (or an external memory which can be managed by the apparatus). Then, the apparatus determines a path (the path contains information (e.g., network address) for specifying the receiving apparatus) on which the print data transmitted from the PC 101 is saved as intermediate data. The apparatus sends back the determined path as storage information to the PC 101. For example, when the print data destination is the multi-functional peripheral 120, the CPU 122 of the multi-functional peripheral 120 registers (saves) the print data transmitted from the PC 101 as intermediate data in the HDD 124. For this purpose, the multi-functional peripheral 120 determines a path for save, and transmits storage information representing the determined path to the PC 101.

If the CPU 102 of the PC 101 detects reception of the storage information (YES in step S309), the process advances to step S310. The CPU 102 attaches the received storage information to print data (step S310), and transmits the print data to an apparatus which is designated by the user and does not have any iPrint function (step S311). Upon reception of the print data, the apparatus prints in accordance with the print data.

By the above process, even if a desired apparatus as a print data destination does not have any iPrint function, the desired printing apparatus can print while using the iprint function. More specifically, an image printed by a printing apparatus having no iPrint function contains a save destination code for specifying print data held in an apparatus having the iprint function. The save destination code is read by a scanner to specify the print data, and the print data can be read out, printed again, and thereby reused. Since the readout print data is output from the printer driver, the image quality hardly degrades in comparison with print data which is printed again (normal copying) by reading a printed product. The print data is held as intermediate language data, does not depend on the PDL type, and can be visualized by various apparatuses capable of interpreting the intermediate language data.

In the first embodiment, the system employs the configuration as shown in FIG. 1, but is not limited to this.

In the above description, a printing apparatus having the iPrint function is searched for. However, a target apparatus need not have all components (holding of print data and addition of a save destination code) of the iPrint function, and suffices to hold at least print data. This is because the save destination code is added by the PC 101 in the above description, and an apparatus for holding print data need not have the function of adding a save destination code. The apparatus need not have the printing function.

Second Embodiment

In the first embodiment, when an apparatus serving as a print data destination does not have any iPrint function, the printer driver or application software searches for a printing apparatus having the iPrint function, and performs registration of intermediate data in the printing apparatus having the iPrint function and addition of storage information to print data. While using the iprint function, the printing apparatus having no iPrint function prints an image containing a save destination code.

In the second embodiment, in transmitting data to a printing apparatus having no iprint function, the printer driver transmits print data to a printing apparatus having the iPrint function instead. After the printing apparatus having the iPrint function performs the iprint process (saving of print data and addition of a save destination code), the printer driver transfers the print data to the printing apparatus which is designated by the user and does not have any iprint function, thereby printing.

Figure 4:
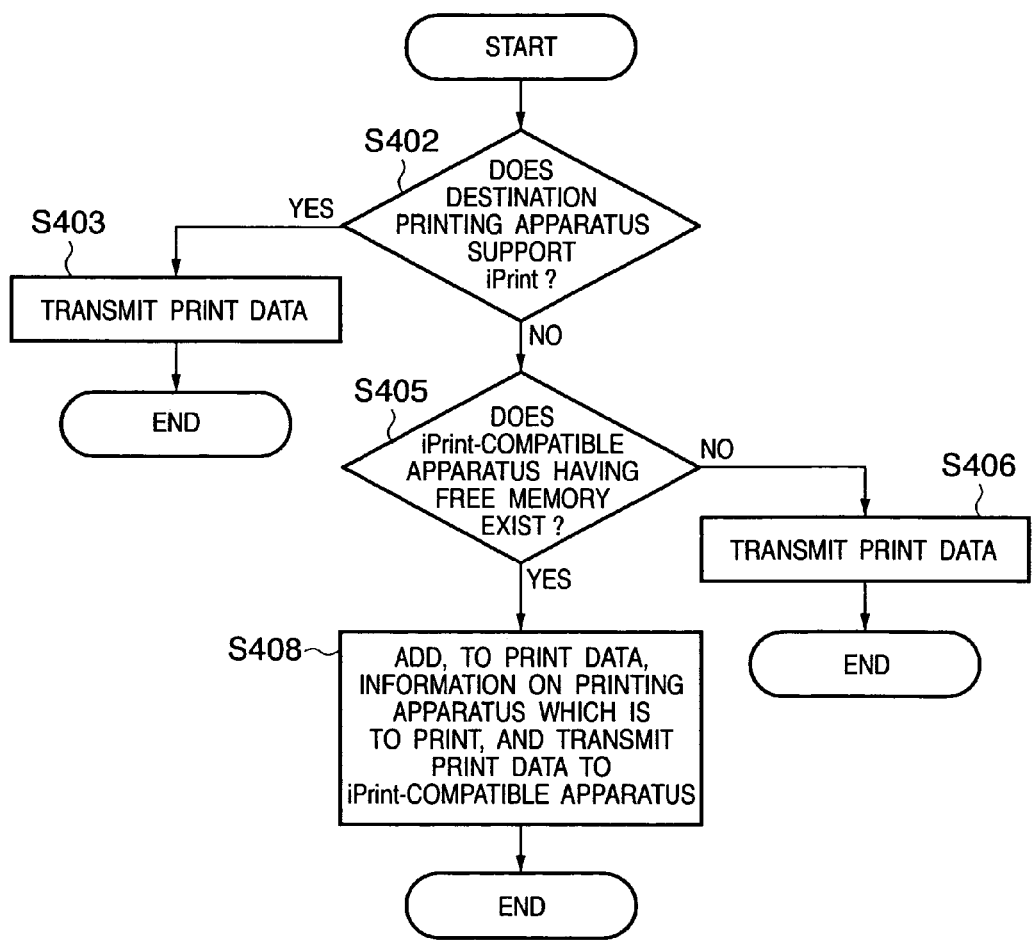
FIG. 4 is a flowchart showing a process executed when the PC 101 transmits print data to either the printing apparatus 110 or multi-functional peripheral 120.

FIG. 4 is a flowchart showing a process executed when a PC 101 transmits print data to either a printing apparatus 110 or multi-functional peripheral 120. A program and data for causing a CPU 102 to execute the process complying with the flowchart of FIG. 4 are loaded from an HDD 104 to a RAM 103. The program and data are executed by the CPU 102, and the PC 101 performs processes to be described below.

The operator of the PC 101 uses an operation unit 106 to input an instruction to print target data. The input method may be the same as in the first embodiment or different. In other words, any input method can be adopted to select data to be printed and input an instruction to print the selected data.

The process according to the flowchart shown in FIG. 4 starts when an instruction to select data to be printed and an instruction to print the selected data are input and detected by the CPU 102.

Processes in steps S402 to S406 are the same as those in steps S302 to S306, and a description thereof will be omitted.

If an apparatus which has the iPrint function and has a free memory enough to store print data to be transmitted by its data size is found in step S405, the process advances to step S408. Information (first specifying information) of the apparatus found in step S405, and information (second specifying information) of a printing apparatus which is instructed by the user to print are attached to the print data, and the resultant print data is transmitted to the apparatus found in step S405 (step S408). In the second embodiment, the first specifying information and second specifying information are the network addresses of apparatuses, but are not limited to them.

Figure 6:
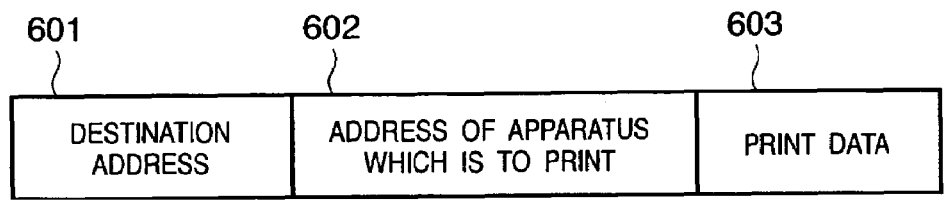
FIG. 6 is a view showing an example of the structure of data generated in step S408.

FIG. 6 is a view showing an example of the structure of data generated in step S408. As shown in FIG. 6, an address 601 serving as the first specifying information and an address 602 serving as the second specifying information are attached to print data 603.

As described above, the address 601 is information for specifying an apparatus found in step S405 (i.e., an apparatus which has the iPrint function and has a free memory enough to store the print data 603 by its data size). Also, as described above, the address 602 is information for specifying an apparatus which is selected as a print data destination by the operator via a window as shown in FIG. 8 or 9.

Figure 5:
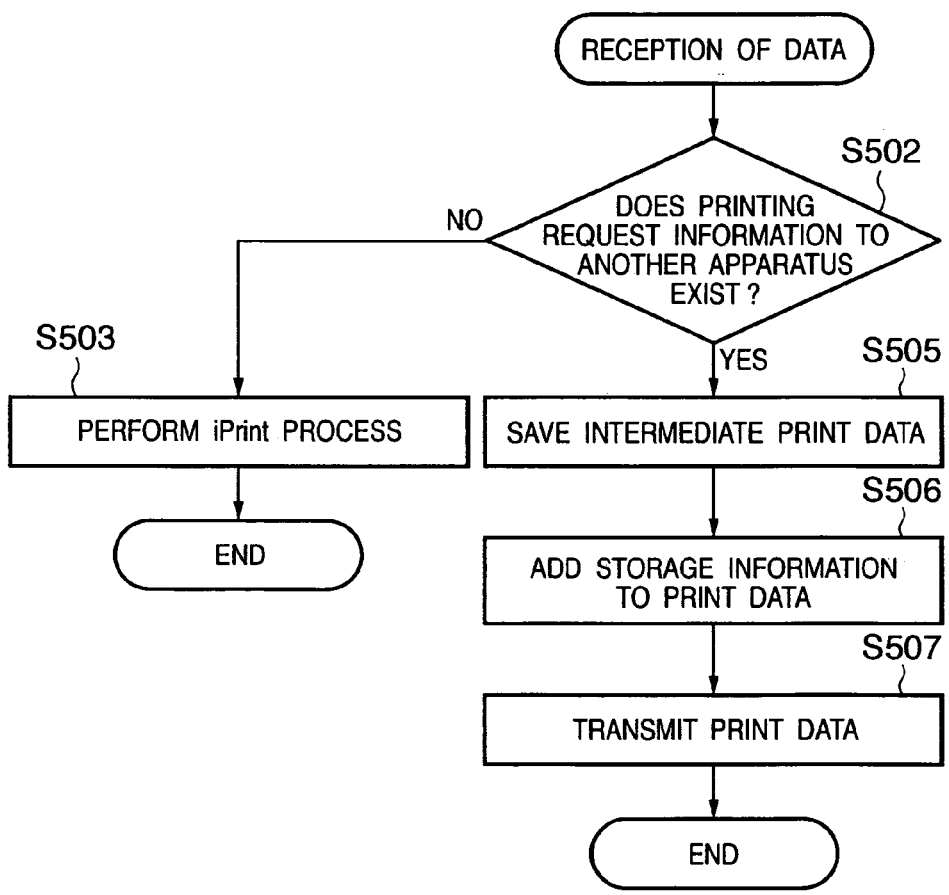
FIG. 5 is a flowchart showing a process performed by an apparatus found in step S405.

A process performed by the apparatus found in step S405 will be explained with reference to FIG. 5 showing a flowchart of the process. In the second embodiment, this apparatus is the multi-functional peripheral 120. A program and data for causing a CPU 122 of the multi-functional peripheral 120 to execute the process complying with the flowchart of FIG. 5 are stored in the RAM 103. The program and data are executed by the CPU 122, and the multi-functional peripheral 120 performs processes to be described below.

The addresses 601 and 602 in data (data having the structure illustrated in FIG. 6) transmitted from the PC 101 are referred to, and it is checked whether the addresses 601 and 602 coincide with each other, i.e., the apparatus found in step S405 (when a plurality of apparatuses are found, an apparatus selected by the operator) and an apparatus selected by the operator as a print data destination coincide with each other (step S502).

If the addresses coincide with each other as a result of the check, the process advances to step S503 to perform a process complying with the iPrint function (step S503).

If the addresses do not coincide with each other as a result of the check process in step S502, the process advances to step S505 to register intermediate data generated on the basis of the received print data in an HDD 124 of the multi-functional peripheral 120. Data is generated by attaching storage information and the address 602 to the received print data (step S506). The generated data is transmitted to an apparatus specified by the address 602 (step S507).

Figure 7:
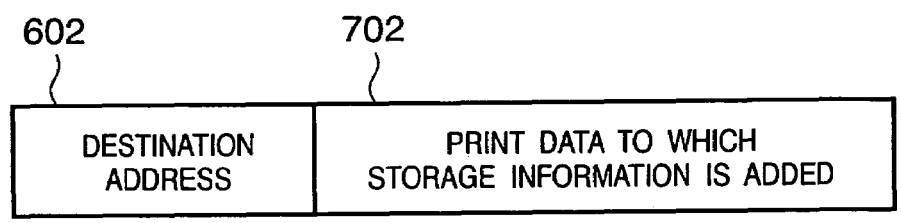
FIG. 7 is a view showing an example of the structure of data generated in step S506.

FIG. 7 is a view showing an example of the structure of data generated in step S506. As shown in FIG. 7, the network address 602 of the apparatus which is selected by the operator as an apparatus which is to print is attached to print data 702 containing storage information (i.e., data which is generated by the PC 101 in the first embodiment, and is to be transmitted to a destination apparatus).

Step S305 (S405) searches for an apparatus which has the iPrint function and has a free memory enough to store print data to be transmitted by its data size. However, the size of the free memory dynamically changes, and a long time may be taken for the search process depending on the traffic of the network. Considering these problems, only an apparatus having the iPrint function may be searched for. In this case, a plurality of apparatuses may be found, and the operator may be prompted to select one of them, as described above.

According to the second embodiment, the PC transmits print data only to an iPrint-compatible apparatus. The iPrint-compatible apparatus transmits the print data to an iprint-incompatible apparatus which is to originally print an image, and causes the iPrint-incompatible apparatus to print. Hence, the process efficiency of the PC becomes higher than in the first embodiment which transmits print data to both an iPrint-incompatible apparatus and iPrint-compatible apparatus.

Other Embodiment

The object of the present invention is also achieved when a recording medium (or storage medium) which records software program codes for realizing the functions of the above-described embodiments is supplied to a camera, and the CPU or MPU of the camera reads out and executes the program codes stored in the recording medium. In this case, the program codes read out from the recording medium realize the functions of the above-described embodiments, and the recording medium which records the program codes constitutes the present invention.

The functions of the above-described embodiments are realized when the camera executes the readout program codes. Also, the functions of the above-described embodiments are realized when an OS (Operating System) or the like running on the camera performs some or all of actual processes on the basis of the instructions of the program codes.

Furthermore, the present invention includes a case in which, after the program codes read out from the recording medium are written in the memory of a function expansion card inserted into the camera or the memory of a function expansion unit connected to the camera, the CPU of the function expansion card or function expansion unit performs some or all of actual processes on the basis of the instructions of the program codes and thereby realizes the functions of the above-described embodiments.

When the present invention is applied to the recording medium, the recording medium records program codes corresponding to the above-described flowcharts (functional configurations).

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-250928 filed on Aug. 30, 2004, which is hereby incorporated by reference herein.

What is claimed is:

1. An information processing apparatus that transmits image data to be printed to a printing apparatus connected to a network, the information processing apparatus comprising:

a determination unit, adapted to determine whether the printing apparatus serving as a transmission destination of the image data has a predetermined function for saving the image data to a save destination, adding a first code representing the save destination of the image data to the image data, and printing the image data together with the first code;

a first transmission unit, adapted to transmit the image data to the printing apparatus, if the determination unit determines that the printing apparatus has the predetermined function;

a search unit, adapted to search for a storage apparatus, different from the printing apparatus, that has a function for saving the image data, if the determination unit does not determine that the printing apparatus has the predetermined function;

a second transmission unit, adapted to transmit the image data to the storage apparatus searched for by said search unit, if the determination unit does not determine that the printing apparatus has the predetermined function; and a third transmission unit, adapted to add, to the image data transmitted by said second transmission unit, a second code representing the save destination of the image data transmitted by said second transmission unit, and transmit the image data to which the second code is added to the printing apparatus, if the determination unit does not determine that the printing apparatus has the predetermined function.

2. The apparatus according to claim 1, wherein said determination unit sends an inquiry to the printing apparatus to check whether the printing apparatus has the predetermined function.

3. The apparatus according to claim 1, wherein said search unit sends an inquiry to apparatuses connected to the network to search for the storage apparatus that has the function for saving the image data.

4. The apparatus according to claim 1, wherein said second transmission unit comprises:

a list display unit, adapted to list and display pieces of information regarding apparatuses searched for by said search unit, and an acceptance unit, adapted to accept an instruction to select one of the pieces of information displayed by said list display unit, and said second transmission unit transmits the image data to the storage apparatus that is selected by the instruction accepted by said acceptance unit.

5. The apparatus according to claim 1, further comprising:

a receiving unit, adapted to receive storage information, indicating the save destination of the image data received by the storage apparatus, from the storage apparatus, wherein the third transmission unit adds, to the image data, the second code representing the save destination of the image data indicated by the storage information received by the receiving unit.

6. An information processing apparatus that transmits image data to be printed to a printing apparatus connected to a network, the information processing apparatus comprising:

a determination unit, adapted to determine whether the printing apparatus serving as a transmission destination of the image data has a predetermined function for saving the image data to a save destination, adding a code representing the save destination of the image data to the image data, and printing the image data together with the code;

a first transmission unit, adapted to transmit the image data to the printing apparatus, if the determination unit determines that the printing apparatus has the predetermined function;

a search unit, adapted to search for a storage apparatus, different from the printing apparatus, that has a function for saving the image data, if the determination unit does not determine that the printing apparatus has the predetermined function; and a second transmission unit, adapted to transmit the image data and information specifying the printing apparatus to the storage apparatus searched for by said search unit so as to save the image data to a predetermined save destination, and transfer, to the printing apparatus, image data to which a code representing the predetermined save destination is added.

7. A system comprising a printing apparatus connected to a network, and an information processing apparatus that transmits image data to be printed to the printing apparatus, wherein the information processing apparatus comprises:

a determination unit, adapted to determine whether the printing apparatus serving as a transmission destination of the image data has a predetermined function for saving the image data to a save destination, adding a first code representing the save destination of the image data to the image data, and printing the image data together with the first code, a first transmission unit, adapted to transmit the image data to the printing apparatus, if the determination unit determines that the printing apparatus has the predetermined function, a search unit, adapted to search for a storage apparatus, different from the printing apparatus, that has a function for saving the image data, if the determination unit does not determine that the printing apparatus has the predetermined function, and a second transmission unit, adapted to transmit the image data and information specifying the printing apparatus to the storage apparatus searched for by said search unit, if the determination unit does not determine that the printing apparatus has the predetermined function, and wherein the storage apparatus comprises:

a registration unit, adapted to register, in a predetermined memory, an image based on the image data transmitted from said second transmission unit, an addition unit, adapted to add a code representing a registration destination of the image registered by said registration unit, and a transfer unit, adapted to transfer, to the printing apparatus, the image data transmitted from said second transmission unit and the code added by said addition unit representing the registration destination.

8. An information processing method of transmitting image data to be printed to a printing apparatus connected to a network, the method comprising:

determining whether the printing apparatus serving as a transmission destination of the image data has a predetermined function for saving the image data to a save destination, adding a first code representing the save destination of the image data to the print data, and printing the image data together with the first code;

transmitting the image data to the printing apparatus, if a determination is made that the printing apparatus has the predetermined function;

searching for a storage apparatus, different from the printing apparatus, that has a function for saving the image data, if the determination is not made that the printing apparatus has the predetermined function;

transmitting the image data to the storage apparatus searched for, if the determination is not made that the printing apparatus has the predetermined function; and adding, to the image data transmitted by said second transmission unit, a second code representing a save destination of the image data transmitted, and transmitting the image data to which the second code is added to the printing apparatus, if the determination is not made that the printing apparatus has the predetermined function.

9. An information processing method of transmitting image data to be printed to a printing apparatus connected to a network, the method comprising:

determining whether the printing apparatus serving as a transmission destination of the image data has a predetermined function for saving the image data to a save destination, adding a code representing the save destination of the image data to the image data, and printing the image data together with the code;

transmitting the image data to the printing apparatus, if a determination is made that the printing apparatus has the predetermined function;

searching for a storage apparatus, different from the printing apparatus, that has a function for saving the image data, if a determination is made that the printing apparatus does not have the predetermined function; and transmitting the image data and information specifying the printing apparatus to the storage apparatus searched for so as to save the image data to a predetermined save destination, and transfer, to the printing apparatus, image data to which a code representing the predetermined save destination is added, if the determination is not made that the printing apparatus has the predetermined function.

10. A computer-readable storage medium storing a computer-executable program that, when executed, causes a computer to perform an information processing method of transmitting image data to be printed to a printing apparatus connected to a network, the method comprising:

determining whether the printing apparatus serving as a transmission destination of the image data has a predetermined function for saving the image data to a save destination, adding a first code representing the save destination of the image data to the print data, and printing the image data together with the first code;

transmitting the image data to the printing apparatus, if a determination is made that the printing apparatus has the predetermined function;

searching for a storage apparatus, different from the printing apparatus, that has a function for saving the image data, if the determination is not made that the printing apparatus has the predetermined function;

transmitting the image data to the storage apparatus searched for, if the determination is not made that the printing apparatus has the predetermined function; and adding, to the image data, a second code representing a save destination of the image data transmitted, and transmitting the image data to which the second code is added to the printing apparatus, if the determination is not made that the printing apparatus has the predetermined function.

* * * * *